Oct. 14, 1947.  E. W. M. FAWCETT ET AL  2,428,841
PRODUCTION OF BRANCHED CHAIN ALKANES
Filed June 30, 1942
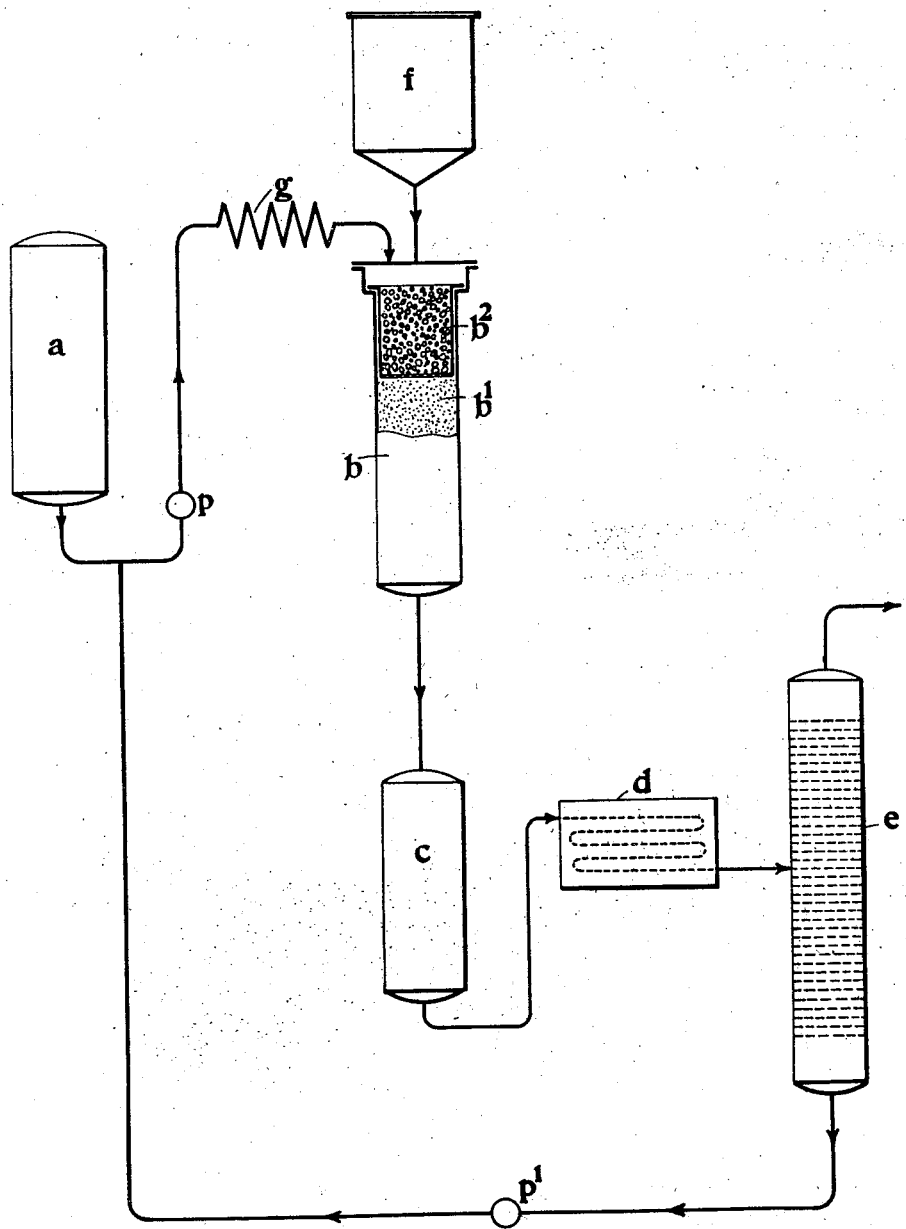

Patented Oct. 14, 1947

2,428,841

UNITED STATES PATENT OFFICE 2,428,841

PRODUCTION OF BRANCHED CHAIN ALKANES

Eric William Musther Fawcett and Gwilym Islwyn Jenkins, Sunbury-on-Thames, England, assignors to Anglo-Iranian Oil Company Limited, London, England, a British joint-stock corporation Application June 30, 1942, Serial No. 449,095
In Great Britain July 1, 1941

1 Claim. (Cl. 260—683.5)

The invention relates to the conversion to branched chain alkanes of normal alkanes containing four or more carbon atoms in the molecule, or hydrocarbon mixtures containing a substantial proportion of such normal alkanes. A typical example is the conversion of n-butane to isobutane.

Such processes are generally carried out by contacting the normal hydrocarbon or hydrocarbons with a catalyst consisting of an aluminium halide, usually aluminium chloride or aluminium bromide, in the presence of a hydrogen halide, such as hydrogen chloride, as catalyst activator. The conversion rate attained in such processes is from the practical point of view rather low. Thus in a continuous flow process the output of the branched chain alkane is low, unless the capacity of the reaction vessels is considerable. To overcome this disadvantage it has been proposed to mix or incorporate a relatively large proportion of aluminium chloride with a porous supporting material in order to increase the available catalyst surface; the increase in output of the product thus obtainable is however restricted.

It has already been proposed in the specification filed pursuant to co-pending application, Serial No. 417,097, filed October 30, 1941, to convert normal alkanes to branched chain alkanes under conditions in which the normal alkane is successively contacted with an isomerisation catalyst such as an aluminium halide and particularly aluminium chloride at an isomerisation reaction temperature and with porous or sorptive substances or surfaces under conditions in which the normal alkane is first contacted with the catalyst before entering the reaction vessel.

According to the present invention the catalyst vapour is produced in the reaction vessel itself. By such means the rate of catalyst flow may advantageously be directly controlled by the reaction temperature.

The aluminium halide vapour may be passed at reaction temperature in a small continuous flow together with the normal hydrocarbon or hydrocarbons to be converted, through the reaction vessel and successively over or through the catalyst and a porous or sorptive medium of high available surface area, such as silica gel, alumina gel, alumina, bauxite or active carbon, or substances having sorptive surfaces, such as porcelain or glass.

The invention comprises the conditions hereinafter described.

An example of the practical application of the invention to the production of isobutane from normal butane is hereinafter described with reference to the accompanying drawing.

In carrying the invention into effect normal butane from a container $a$ is passed to the reaction vessel $b$ by the pump $p$ after first passing through the preheater $g$, whereby the normal butane is heated to the reaction temperature. The reaction vessel $b$ is charged at its upper part with an aluminium halide catalyst $b^2$, such, for example, as aluminium chloride in lumps, which may be held within a perforated container, and in the lower part the reaction vessel is charged with a porous or sorptive medium $b^1$, such as active carbon, in a granular condition.

The normal butane first preheated to a determined temperature, on entering the reaction vessel $b$ passes first over or through the catalyst $b^2$, and the catalyst vapour is thus entrained in constant flow and together with the normal butane passes through the sorptive medium $b^1$. Thus the normal butane contacts with the sorptive surfaces of the sorptive medium in the presence of the aluminium chloride vapour.

The rate of flow of the catalyst vapour is controlled by the temperature in the reaction vessel $b$, and while in general it is preferred to operate the reaction vessel $b$ as a whole at the same temperature, a temperature gradient may be established such that the upper part of the reaction space containing the catalyst $b^2$ may be maintained at a determined temperature lower than that containing the sorptive medium $b^1$ by means of electric heating elements (not shown) disposed in or on the walls of the reactor.

The catalyst vapour entrained by the feedstock is removed from the product stream on passing into the final sorption vessel $c$, which is packed with a sorptive medium, such as alumina or silica gel, maintained at a determined temperature lower than that of the reaction vessel $b$. The reaction product thus freed from catalyst is condensed in the condenser $d$, and may pass to a fractionating column $e$ where complete or partial separation of n-butane and isobutane is carried out. The normal butane or normal-butane-rich fraction may generally be recycled to the reaction vessel by a pump $p^1$.

When the supply of catalyst in the reaction vessel has been used, a further quantity may be admitted to the upper part of the reaction vessel $b$ from a hopper $f$.

The process is advantageously carried out at an elevated reaction temperature, in no case exceeding 250° C., and generally at a temperature within the range 75° C.–125° C.

A particular advantage of the process of the invention is that high conversion rates may be achieved at relatively low temperatures, for example at or below 100° C., whereby operation at a high temperature with consequent liability to by-product formation is avoided, and the amount of catalyst used is very small.

In order to secure high yields of the conversion product without also increasing the normal reaction space, it is advantageous to operate under superatmospheric pressure, usually within a range of 1 to 15 atmospheres, and to use a known catalyst activator, such as hydrogen halide, usually hydrogen chloride, or water, or both, by addition to the normal hydrocarbon feedstock. To avoid decomposition of the catalyst vapour it is desirable that the packing in the reaction vessel should be carefully dried before use.

The porous or sorptive substance may also be contained in a perforated casing adapted to be passed into the lower part of the reaction vessel, the catalyst being mounted in position above.

The invention is hereinbefore described in relation to a continuous flow reaction system, but it will be understood that the invention may be carried out in batchwise operation.

It will furthermore be understood that the product stream leaving the reaction vessel may be processed in any convenient manner to recover its aluminium halide content for re-use.

The following are examples of process conditions.

*Example 1.*—A reaction vessel was packed with 25 ccs. of lump aluminium chloride and 50 ccs. of pelleted alumina. Normal butane (12.5 ccs. per minute) containing hydrogen chloride (2.2 ccs. per minute) was passed successively through aluminium chloride and pelleted alumina packed in beds one above the other in the reaction vessel, and the aluminium chloride and alumina maintained at 132° C. and under atmospheric pressure. The hydrocarbon product was found to contain 63% of isobutane.

*Example 2.*—Under conditions similar to Example 1 but using alumina gel instead of pelleted alumina and a normal butane feed rate of 12.5 ccs. per minute in the presence also of 1.4 ccs. per minute of hydrogen chloride, the hydrocarbon product was found to contain 60% of isobutane.

*Example 3.*—Under conditions similar to Example 1, but using active carbon instead of pelleted alumina at a temperature of 100° C., the normal butane feed rate was 25 ccs. per minute, and the hydrogen chloride flow rate was 1.32 ccs. per minute. The hydrocarbon product contained 46% of isobutane.

*Example 4.*—Under conditions similar to Example 1 in which the reaction vessel was packed with 100 ccs. of lump aluminium chloride and 600 ccs. of active carbon instead of pelleted alumina, a stream of normal butane containing 0.1% by volume of hydrogen chloride under a pressure of 7 atmospheres and at a rate equivalent to 2.7 liquid volumes of normal butane per volume of carbon per hour. The reaction temperature was maintained at 110° C. The hydrocarbon product was found to contain 39.6% of isobutane.

*Example 5.*—Under conditions similar to Example 1 the reaction vessel was packed with 20 ccs. of aluminium chloride and 30 ccs. of granulated bauxite instead of pelleted alumina, the normal butane feed rate was 20 ccs. per minute in the presence of 0.202 cc. per minute of hydrogen chloride. The reaction vessel was maintained at a temperature of 110° C. and under atmospheric pressure. The hydrocarbon product contained 48% of isobutane.

*Example 6.*—Under conditions similar to Example 1, the reaction vessel was packed with 5 ccs. of aluminium chloride and 4.5 ccs. of granulated bauxite instead of pelleted alumina, while a stream of normal butane, containing 0.5% by weight of hydrogen chloride, under a pressure of 10 atmospheres and at a rate equivalent to 1.0 liquid volumes of normal butane per volume of bauxite per hour was passed through the vessel. The reaction temperature was maintained at 110° C. The hydrocarbon product contained 57% of isobutane.

*Example 7.*—The reaction vessel was packed with 65 grams of lump aluminium chloride and 500 ccs. of alumina gel and a stream of normal butane, containing 1.5% by weight of hydrogen chloride was passed under a pressure of 10 atmospheres and at a rate equivalent to 1.0 liquid volumes of normal butane per volume of alumina gel per hour. The reaction temperature was maintained at 110° C. The hydrocarbon product stream contained 48.3% of isobutane.

*Example 8.*—Under conditions similar to Example 7 but using granulated bauxite instead of alumina gel, the hydrocarbon product stream was found to contain 60% of isobutane.

*Example 9.*—Under conditions similar to Example 1, the reaction vessel was packed with 27 ccs. of lump aluminum chloride and 27 ccs. of granulated activated carbon, instead of pelleted alumina. Normal pentane at a feed rate of 225 ccs. of vapour per minute was passed through the reaction vessel which was maintained at a temperature of 100° C. and under atmospheric pressure. The hydrocarbon product stream contained 20% of isobutane.

*Example 10.*—Under conditions similar to Example 1, in which the reaction vessel was packed with 30 ccs. of lump aluminum chloride and 60 ccs. of granulated bauxite instead of pelleted alumina, and normal hexane, used as feedstock, at a feed rate equivalent to 5 ccs. of liquid hexane per hour together with hydrogen chloride at a flow rate of 25 ccs. of gas per hour. The reaction vessel was maintained at a temperature of 85° C. and under atmospheric pressure. The hydrocarbon product stream contained 32% of branched chain hexanes.

We claim:

A continuous process for the production of branched chain alkanes from normal alkanes comprising providing an isomerisation reaction vessel having a bed of solid aluminium halide in its upper portion and a bed of solid adsorptive medium of high available surface area subjacent thereto, said adsorption bed being maintained at a relatively low isomerisation reaction temperature at least equal to the temperature of said bed of solid aluminium halide, flowing a feedstock comprised of a normal alkane and a small proportion of hydrogen halide downwardly through said vessel over the material of said beds, and flowing fresh additional solid aluminium halide onto said bed of aluminium halide as the supply of solid aluminium halide is consumed and requires replenishing.

ERIC WILLIAM MUSTHER FAWCETT.
GWILYM ISLWYN JENKINS.

REFERENCES CITED

The following references are of record in the file of this patent:

UNITED STATES PATENTS

| Number | Name | Date |
|---|---|---|
| 2,277,022 | McMillan et al. | Mar. 17, 1942 |
| 2,281,924 | De Simo et al. | May 5, 1942 |
| 2,324,746 | Weinrich et al. | July 20, 1943 |
| 2,330,079 | Owen | Sept. 21, 1943 |